US011725017B2

(12) United States Patent
Knott et al.

(10) Patent No.: US 11,725,017 B2
(45) Date of Patent: *Aug. 15, 2023

(54) METHOD FOR PREPARING SIOC-LINKED POLYETHER SILOXANES BRANCHED IN THE SILOXANE PART

(71) Applicant: Evonik Operations GmbH, Essen (DE)

(72) Inventors: Wilfried Knott, Essen (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 451 days.

This patent is subject to a terminal disclaimer.

(21) Appl. No.: 16/759,413

(22) PCT Filed: Aug. 15, 2018

(86) PCT No.: PCT/EP2018/072087
§ 371 (c)(1),
(2) Date: Apr. 27, 2020

(87) PCT Pub. No.: WO2019/105608
PCT Pub. Date: Jun. 6, 2019

(65) Prior Publication Data
US 2020/0339612 A1    Oct. 29, 2020

(30) Foreign Application Priority Data
Nov. 29, 2017  (EP) .................................. 17204277

(51) Int. Cl.
C08G 77/08 (2006.01)
C07F 7/18 (2006.01)
C07F 7/20 (2006.01)
C08G 77/06 (2006.01)
C08G 77/46 (2006.01)

(52) U.S. Cl.
CPC .............. C07F 7/1892 (2013.01); C07F 7/20 (2013.01); C08G 77/06 (2013.01); C08G 77/46 (2013.01); C08G 77/08 (2013.01)

(58) Field of Classification Search
CPC ........ C80G 77/08; C80G 77/06; C80G 77/38; C80G 77/46
See application file for complete search history.

(56) References Cited

U.S. PATENT DOCUMENTS

| | | | |
|---|---|---|---|
| 2,910,496 A | 10/1959 | Bailey et al. | |
| 3,115,512 A * | 12/1963 | Rossmy | C07F 7/0876 252/78.3 |
| 3,299,113 A * | 1/1967 | Haluska | C08G 77/46 521/137 |
| 3,346,610 A | 10/1967 | Omietanski et al. | |
| 3,356,758 A | 12/1967 | Omietanski et al. | |
| 3,526,651 A * | 9/1970 | Wassermeyer | C08G 77/46 528/21 |
| 3,532,732 A * | 10/1970 | Wassermeyer | C08J 9/0061 556/428 |
| 3,595,885 A | 7/1971 | Rossmy et al. | |
| 3,775,452 A | 11/1973 | Karstedt | |
| 3,980,688 A * | 9/1976 | Litteral | C08G 77/46 521/112 |
| 4,066,680 A | 1/1978 | Lewis et al. | |
| 4,105,567 A * | 8/1978 | Koerner | C07F 7/0838 252/8.84 |
| 4,177,201 A * | 12/1979 | de Montigny | C08G 77/14 556/416 |
| 4,260,715 A * | 4/1981 | de Montigny | C08G 77/14 556/456 |
| 4,281,144 A * | 7/1981 | de Montigny | C08G 77/10 556/416 |
| 4,380,451 A | 4/1983 | Steinberger et al. | |
| 4,417,068 A | 11/1983 | Kollmeier et al. | |
| 5,158,922 A | 10/1992 | Hinney et al. | |
| 5,625,024 A * | 4/1997 | Schlitte | C08G 77/46 528/31 |
| 6,160,148 A | 12/2000 | Dauth et al. | |
| 6,307,082 B1 | 10/2001 | Klein et al. | |
| 6,521,771 B2 | 2/2003 | Frommeyer et al. | |
| 6,659,162 B2 | 12/2003 | Frommeyer et al. | |
| 6,854,506 B2 | 2/2005 | Knott et al. | |
| 6,858,663 B2 | 2/2005 | Knott et al. | |
| 6,874,562 B2 | 4/2005 | Knott et al. | |
| 6,915,834 B2 | 7/2005 | Knott et al. | |
| 6,942,716 B2 | 9/2005 | Knott et al. | |
| 7,125,585 B2 | 10/2006 | Dudzik et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |

(Continued)

FOREIGN PATENT DOCUMENTS

DE           1545110 A1       6/1969
DE   10 2005 004676 A1       8/2006
(Continued)

OTHER PUBLICATIONS

Knott et al., U.S. Appl. No. 17/145,558, filed Jan. 11, 2021.
(Continued)

Primary Examiner — Margaret G Moore
(74) Attorney, Agent, or Firm — Grüneberg and Myers, PLLC

(57) ABSTRACT

Described is a process for producing SiOC-bonded polyether siloxanes branched in the siloxane portion from cyclic branched siloxanes of the D/T type, wherein said process comprises in a first step reacting the mixtures of cyclic branched siloxanes of the D/T type with acetic anhydride optionally in admixture with simple siloxane cycles under acid catalysis to afford acetoxy-bearing branched siloxanes, in a second step performing the equilibration of the acetoxy-modified branched siloxane with trifluoromethanesulfonic acid, preferably with addition of acetic acid, and in a third step reacting the trifluoromethanesulfonic acid-treated acetoxysiloxane with polyetherols optionally in the presence of bases and optionally in the presence of an inert solvent.

20 Claims, No Drawings

(56) References Cited

U.S. PATENT DOCUMENTS

| | | | |
|---|---|---|---|
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 8,138,294 B2 | 3/2012 | Henning et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,609,798 B2 | 12/2013 | Knott et al. |
| 8,623,984 B2 | 1/2014 | Henning et al. |
| 8,722,834 B2 | 5/2014 | Knott et al. |
| 8,722,836 B2 | 5/2014 | Knott et al. |
| 8,729,207 B2 | 5/2014 | Hartung et al. |
| 8,772,423 B2 | 7/2014 | De Gans et al. |
| 8,779,079 B2 | 7/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,068,044 B2 | 6/2015 | Schubert et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,481,695 B2 | 11/2016 | Knott et al. |
| 9,540,500 B2 | 1/2017 | Ferenz et al. |
| 9,695,202 B2 | 7/2017 | Henning et al. |
| 9,783,635 B2 | 10/2017 | Schubert et al. |
| 9,896,541 B2 | 2/2018 | Fiedel et al. |
| 9,975,909 B2 | 5/2018 | Schubert et al. |
| 10,087,278 B2 | 10/2018 | Fiedel et al. |
| 10,099,211 B2 | 10/2018 | Knott et al. |
| 10,106,649 B2 | 10/2018 | Fiedel et al. |
| 10,399,998 B2 | 9/2019 | Knott et al. |
| 10,407,592 B2 | 9/2019 | Amajjahe et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,836,867 B2 | 11/2020 | Knott |
| 10,954,344 B2 * | 3/2021 | Knott ................ C08G 77/46 |
| 11,066,429 B2 | 7/2021 | Knott et al. |
| 2002/0161158 A1 | 10/2002 | Burkhart et al. |
| 2007/0128143 A1 | 6/2007 | Gruning et al. |
| 2009/0137752 A1 | 5/2009 | Knott et al. |
| 2010/0022435 A1 | 1/2010 | Henning et al. |
| 2010/0081781 A1 | 4/2010 | Schubert et al. |
| 2011/0230619 A1 | 9/2011 | Kuppert et al. |
| 2011/0301254 A1 | 12/2011 | Knott et al. |
| 2012/0068110 A1 | 3/2012 | Schubert et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2016/0130402 A1 | 5/2016 | Schubert et al. |
| 2017/0198099 A1 | 7/2017 | Knott |
| 2018/0016392 A1 | 1/2018 | Lobert et al. |
| 2018/0258228 A1 | 10/2018 | Amajjahe et al. |
| 2018/0305596 A1 | 10/2018 | Schubert et al. |
| 2019/0106369 A1 | 4/2019 | Schubert et al. |
| 2019/0106441 A1 | 4/2019 | Knott et al. |
| 2019/0100625 A1 | 9/2019 | Knott et al. |
| 2020/0055991 A1 | 2/2020 | Knott et al. |
| 2020/0055992 A1 | 2/2020 | Knott et al. |
| 2020/0216474 A1 | 7/2020 | Fiedel et al. |
| 2020/0377526 A1 | 7/2020 | Knott et al. |
| 2020/0377524 A1 | 12/2020 | Knott et al. |
| 2020/0377525 A1 | 12/2020 | Knott et al. |
| 2020/0377660 A1 | 12/2020 | Knott et al. |
| 2020/0377665 A1 | 12/2020 | Knott et al. |
| 2020/0377666 A1 | 12/2020 | Knott et al. |
| 2020/0377686 A1 | 12/2020 | Knott et al. |
| 2020/0385528 A1 | 12/2020 | Knott |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0253780 A1 | 8/2021 | Wessely et al. |
| 2021/0253799 A1 | 8/2021 | Knott et al. |
| 2021/0301099 A1 | 9/2021 | Knott et al. |
| 2021/0371598 A1 | 12/2021 | Knott et al. |
| 2022/0348721 A1 * | 11/2022 | Knott .................... C08G 77/04 |

FOREIGN PATENT DOCUMENTS

| | | | |
|---|---|---|---|
| EP | 0075703 A1 | 4/1983 |
| EP | 0654302 A1 | 5/1995 |
| EP | 0 884 345 A1 | 12/1998 |
| EP | 1031603 A2 | 8/2000 |
| EP | 2 628 771 A1 | 8/2013 |
| EP | 3321304 A1 | 5/2018 |
| EP | 3 401 353 A1 | 11/2018 |
| EP | 3 467 006 A1 | 4/2019 |
| WO | 02/060621 A2 | 8/2002 |
| WO | 02/094483 A2 | 11/2002 |
| WO | 2009/065644 A1 | 5/2009 |
| WO | 2013/010747 A1 | 1/2013 |
| WO | 2013/109523 A1 | 7/2013 |
| WO | 2015/003875 A1 | 1/2015 |
| WO | 2016/005157 A1 | 1/2016 |
| WO | 2019/076552 A1 | 4/2019 |
| WO | 2019/219446 A1 | 11/2019 |
| WO | 2019/219452 A1 | 11/2019 |

OTHER PUBLICATIONS

Knott et al., U.S. Appl. No. 17/297,372, filed May 26, 2021.
Knott et al., U.S. Appl. No. 17/476,417, filed Sep. 15, 2021.
Fiedel et al., U.S. Appl. No. 16/648,345, filed Mar. 18, 2020.
German language International Search Report dated Oct. 25, 2018 in PCT/EP2018/072087 (4 pages).
German language Written Opinion dated Oct. 25, 2018 in PCT/EP2018/072087 (6 pages).
International Search Report dated Oct. 25, 2018 in PCT/EP2018/072087 (3 pages).
Knott et al., U.S. Appl. No. 16/849,013, filed Apr. 15, 2020.
Knott et al., U.S. Appl. No. 16/849,106, filed Apr. 15, 2020.
Knott et al., U.S. Appl. No. 16/849,181, filed Apr. 15, 2020.
Knott et al., U.S. Appl. No. 16/850,198, filed Apr. 16, 2020.
European Search Report dated Apr. 26, 2018 in EP 17204277.2 (6 pages).
Knott et al., U.S. Appl. No. 17/239,011, filed Apr. 23, 2021.
Pola et al., "Mechanism of Reversible Cleavage of Acetoxysilanes to Siloxanes and Acetanhydride," copyright 1974, Collect. Czech. Chem. Commun., 39(5), pp. 1169-1176 (8 pages).
Borisov et al., "Acetoxysiloxane Oligomers: I. Interaction of Acetic Anhydride with Cyclic Dimethylsiloxanes", Journal of Organometallic Chemistry, vol. 11, 1986, pp. 27-33.
Noll W., Chemie und Technologie der Silicone [Chemistry and Technology of the Silicones], Verlag Chemie GmbH, Weinheim (1960), p. 2 ff.

(56) References Cited

OTHER PUBLICATIONS

Pola et al., "Mechansim of Reversible Cleavage of Acetoxysilanes to Siloxanes and Acetanhydride", Collection Czechoslov. Chem. Commun., vol. 39, No. 5, 1974, pp. 1169-1176.
Simmler Walter, Houben-Weyl, Methods of Organic Chemistry, vol. V1/2, 4$^{th}$ Edition, O-Metal Derivates of Organic Hydroxy Compounds p. 162 ff., 1963, pp. 77-170, with partial English translation.
West Robert C., "Azeotropes", CRC Handbook of Chemistry and Physics, 58$^{th}$ Edition, 1977-1978, 3 pages.
U.S. Appl. No. 17/239,011, filed Apr. 23, 2021, 2021/0371598, Knott et al.

* cited by examiner

METHOD FOR PREPARING SIOC-LINKED POLYETHER SILOXANES BRANCHED IN THE SILOXANE PART

CROSS REFERENCE TO RELATED APPLICATIONS

This application is a 35 U.S.C. § 371 U.S. national phase entry of International Application No. PCT/EP2018/072087 having an international filing date of Aug. 15, 2018, which claims the benefit of European Application No. 17204277.2 filed Nov. 29, 2017, each of which is incorporated herein by reference in its entirety.

FIELD

The invention relates to a process for producing SiOC-bonded polyether siloxanes branched in the siloxane portion. The invention further also relates to preparations consisting of an SiOC-bonded branched silicone polyether together with a polyetherol and an acetyl-endcapped polyetherol. The invention further relates to the use of these SiOC-bonded polyether siloxanes branched in the siloxane portion as defoamers, as foam stabilizers, wetting agents, paint and flow additives and as demulsifiers.

BACKGROUND

Cited as a reference in relation to the M, D, T, Q nomenclature used in the context of this document to describe the structural units of organopolysiloxanes is W. Noll, Chemie und Technologie der Silicone [Chemistry and Technology of the Silicones], Verlag Chemie GmbH, Weinheim (1960), page 2 ff.

Older processes for producing branched SiOC-bonded polyether siloxanes are based essentially on chlorosilane chemistry (methyltrichlorosilane and dimethyldichlorosilane) and provide for bonding the polyether substituents by reaction of the SiCl-bearing siloxanes with the respective polyetherol in the presence of suitable auxiliary bases to bind in the form of salts the hydrochloric acid liberated in the bond forming reaction. While the simple chlorosilanes originating directly from the Müller-Rochow synthesis (direct synthesis) are advantageous, the storage and handling of these corrosive reactants on a production scale raise numerous problems such as for example questions of material resistance, offgas and waste issues etc., which makes such old processes increasingly unattractive today.

As yet unpublished patent applications EP17156421.4, EP 17169876.4 concern mixtures of cyclic branched siloxanes of the D/T type and teach the further processing thereof to afford functionalized branched siloxanes and/or branched silicone oils. The further processing disclosed therein is effected by acidic equilibration of the D/T structured siloxanes with silanes and/or siloxanes.

SiOC-bonded polyether siloxanes branched in the siloxane portion are thus obtainable, for example, by equilibrating mixtures of cyclic branched siloxanes of the D/T type with diethoxydimethylsilane and then undertaking by way of a transesterification for example metal-catalysed replacement of the ethoxy substituents by polyalkyleneoxy radicals.

However, diethoxydimethylsilane is a costly modifying agent, thus limiting its broad application.

Specifically, the technical problem to be solved is therefore that of finding a simple and also economic process allowing the production of SiOC-bonded polyether siloxanes branched in the siloxane portion.

In addition, for the sake of sustainability, reactants such as chlorosilanes/chlorosiloxanes and intermediates such as the mineral acid-treated alkylhalosiloxanes, for example the long-known chlorosiloxanyl sulfates, are to be intentionally avoided in the synthesis problem to be solved according to the invention.

In addition the SiOC-bonded polyether siloxanes branched in the siloxane portion should have a good performance quality.

Branched and unbranched siloxanes bearing acyloxy or acetoxy groups on their dialkylsiloxy termini are already known from U.S. Pat. No. 3,595,885 where their production from terminally halogen-substituted siloxanes by reaction with mono- and/or polybasic carboxylic acids, the salts of such carboxylic acids or the anhydrides of such carboxylic acids is described. In particular the use of carboxylic acids and anhydrides thereof in the equilibrated systems considered therein always results in the presence of the sulfuric acid incorporated into the siloxane scaffolds in the form of bridging sulfato groups which is explained by the preferred use of the chlorosiloxanyl sulfates employed as reactant there. As is known to those skilled in the art sulfato-bridged siloxanes are, however, reactive species which for example upon storage and depending on temperature and any ingress of moisture into the system can undergo undesired subsequent reactions to liberate sulfuric acid.

Likewise known from numerous publications and property right searches is the non-equilibrating opening of simple unbranched siloxane cycles with acetic anhydride to afford short-chain, chain-terminal acetoxy-bearing siloxanes in the presence of catalysts.

Thus, Borisov and Sviridova describe the opening of cyclic dimethylsiloxanes with acetic anhydride in the presence of catalytic amounts of iron(III) chloride to afford short-chain $\alpha,\omega$-acetoxysiloxanes (S. N. Borisov, N. G.Sviridova, J. Organomet. Chem. 11 (1968), 27-33). Lewis et al. are concerned in U.S. Pat. No. 4,066,680 with the production of short-chain $\alpha,\omega$-siloxanediols, wherein octamethylcyclotetrasiloxane is reacted with acetic anhydride over acid-treated fuller's earths and the thus-obtained mixtures of short-chain $\alpha,\omega$-acetoxysiloxanes are hydrolysed in alkalified water.

U.S. Pat. No. 3,346,610 likewise discloses a route to acetoxy-bearing, short-chain siloxanes based on metal-halide-induced acetoxy modification of strained cyclic siloxanes by reacting said siloxanes with acetoxy-containing silicone compounds. A multiplicity of Friedel-Crafts-active metal halides act as a catalyst here, wherein zinc chloride is commended as preferred. A specific objective of U.S. Pat. No. 3,346,610 is the acetoxy-modification of strained diorganosiloxane cycles with deliberate avoidance of equilibration processes.

The prior art thus relates to endeavors which provide for the opening of cyclic siloxanes—sometimes strained cyclosiloxanes—with acyloxy-containing reactants and which have for their objective to obtain defined linear short-chain siloxane species still requiring separation by means of fractional distillation.

However, the pure-chain acetoxy-modified siloxane compounds of defined molar mass that have been synthesized by this route are unsuitable for the production of organomodified siloxanes, in particular polyether siloxanes, that are employed in demanding industrial applications, for example in PU foam stabilization or in the defoaming of fuels, etc. Active ingredients that effectively address such a field of use are always characterized by a broad oligomer distribution comprising high, medium and low molar masses, since the oligomers present therein, depending on their molar mass and hence their diffusion characteristics, can very commonly be imputed to have differentiated surfactant tasks in different time windows of the respective process. Specifically in the case of the branched organomodified siloxanes, due to the reactivity characteristics of M, D and T units that have been discussed at the outset, however, a good oligomer distribution combined with a uniform distribution of siloxane units in a statistical manner as far as possible in the individual molecules can only be achieved when the starting material of the D/T type used already itself conforms to a distribution function.

Acyloxyorganopolysiloxanes and in particular organosiloxanes having terminal acyloxy groups are known as starting materials for subsequent reactions. Thus, for example the acyloxy groups in a diorganosiloxane may be hydrolysed, whereupon the hydrolysate may be dehydrated and the dehydrated hydrolysate polymerized to form flowable diorganopolysiloxane. These flowable polysiloxanes are suitable as starting materials for the production of viscous oils and rubbers which may be cured to afford silicone elastomers.

Organosiloxanes provided with terminal acyloxy groups may be obtained for example by reaction of an alkyl siloxane and an organic acid and/or the anhydride thereof in the presence of sulfuric acid as catalyst. Such a process is described in US patent document U.S. Pat. No. 2,910,496 (Bailey et al.). Although this process in principle also affords organosiloxanes having terminal acyloxy groups, the process has the disadvantage that the reaction product consists of a mixture of acyloxy-containing siloxanes and acyloxy-bearing silanes of varying composition. In particular, the teaching in this regard explains that alkyl siloxane copolymers composed of M, D and T units are cleaved by the process into trimethylacyloxysilane, diacyloxydimethylsiloxane and methyltriacyloxysilane. Thus, Bailey obtains in the reaction of octamethylcyclotetrasiloxane with acetic anhydride and acetic acid, after neutralization of the sulfuric acid used as catalyst, separation of the salts and removal of water, residual acetic acid and acetic anhydride, a complex substance mixture and certainly not an equilibrate which is then subjected to fractional distillation (see example, ibid.). The chemical identity of the thus obtained fractions II and IV remains unclear and it is therefore difficult in this way to obtain defined products or to separate these in high yields from the mixture.

Citing Bailey et al. (U.S. Pat. No. 2,910,496), DE 1545110 (A1) (Omietanski et al.) teaches a process in which an acyloxy group of an acyloxysiloxane is reacted with the hydroxyl group of a polyoxyalkylenehydroxy polymer to afford a siloxane-oxyalkylene block mixed polymer and a carboxylic acid, wherein the carboxylic acid is removed from the reaction mixture. The solventless reactions described therein in some cases require considerable reaction times (up to 11.5 hours (example 1)), very high reaction temperatures (150° C. to 160° C. (example 1)) and application of an auxiliary vacuum/stripping of the reaction matrix with dry nitrogen over the entire reaction duration.

SUMMARY

It has now been found that, surprisingly, SiOC-bonded polyether siloxanes branched in the siloxane portion may be produced from cyclic branched siloxanes of the D/T type by in a first step reacting cyclic branched siloxanes of the D/T type with acetic anhydride optionally in admixture with simple siloxane cycles under acid catalysis to afford acetoxy-bearing branched siloxanes and in a second step performing the equilibration of the acetoxy-modified branched siloxane with trifluoromethanesulfonic acid and in a third step reacting the trifluoromethanesulfonic acid-treated acetoxysiloxane with polyetherols optionally in the presence of bases and optionally in the presence of an inert solvent.

DETAILED DESCRIPTION

The inventors have found that, surprisingly, both mixtures of cyclic branched siloxanes of the D/T type which consist exclusively of siloxanes comprising D and T units and whose $^{29}$Si NMR spectroscopy-determinable cumulative proportion of D and T units comprising Si-alkoxy and/or SiOH groups present in the siloxane matrix, is less than 2 mole percent, preferably less than 1 mole percent, and which advantageously further contain at least 5% by weight of siloxane cycles, such as preferably octamethylcyclotetrasiloxane (D4), decamethylcyclopentasiloxane (D5) and/or mixtures thereof, and mixtures of cyclic branched siloxanes comprising exclusively D and T units whose $^{29}$Si NMR spectroscopy-determinable cumulative proportion of D and T units comprising Si-alkoxy and/or SiOH groups present in the siloxane matrix is greater than 2 and less than 10 mole percent are particularly suitable for use in inventive step 1.

The cyclic branched siloxanes of the D/T type employed in the first step are both described by way of example in the experimental part and described in detail in the as yet unpublished patent applications EP17156421.4, EP 17169876.4. Both documents are accordingly incorporated in their entirety into the disclosure content of this application.

The term "inert solvent" is to be understood as comprising all solvents which under the conditions of the reaction specified here do not react with potential reaction partners or in any case react therewith only to a negligible extent. The inert solvent is in particular an aromatic, preferably alkylaromatic, solvent and very particularly preferably toluene.

The simple siloxane cycles optionally also added in the acetylation step comprise in particular octamethylcyclotetrasiloxane, decamethylcyclopentasiloxane, dodecamethylcyclohexasiloxane and/or admixtures thereof having any desired composition, which corresponds to a preferred embodiment of the invention.

The observation that mixtures of siloxanes comprising D and T units having an elevated content of Si-alkoxy and/or SiOH groups are also suitable for further processing according to the invention is not foreseeable to those skilled in the art in light of the difficulties in equilibration thereof described in as yet unpublished patent application EP 17169876.4 and in as yet unpublished patent application EP 17195510.7.

Thus in the context of the present invention the experimental part shows not only the inventive use of a cyclic branched siloxane having a target D/T ratio of 6:1 and a content of spectroscopically detected Si units comprising Si-alkoxy/SiOH groups of 0.43 mole percent (examples 2, 3, 4 and 5) but also the inventive use of a cyclic branched siloxane having a target D/T ratio of 6:1 and a content of spectroscopically detected Si units comprising Si-alkoxy/SiOH groups of 4.0 mole percent (examples 7 and 8).

Since the SiOC-bonded polyether siloxanes branched in the siloxane portion which result in accordance with the invention derive from equilibrated siloxane oligomers, performance quality is ensured.

The production of a singly branched acetoxy-bearing siloxane scaffold by substitution of silicon-bonded chlorine by acetic acid and the replacement of acetoxy groups by polyetheroxy radicals associated with salt formation are described in U.S. Pat. No. 4,380,451, ibid., example 1. Here, the acetoxy-bearing siloxane in toluene is initially charged with vigorous stirring and a mixture of a butanol-started polyetherol in toluene is fed in over 15 minutes before ammonia is introduced over 45 minutes. The reaction mixture is then heated to 80° C., a small amount of isopropanol is added and the matrix is further saturated with ammonia over 3 hours. After cooling to room temperature the salts are separated by filtration and the toluene is distilled at 100° C. and an auxiliary vacuum of 20 mbar.

However, this synthesis route based on chlorosilanes and associated with considerable salt formation is disadvantageous from the perspective of economic production since significant costs and associated product losses must be accepted for the filtration.

However, it has further been found in the context of the present invention that, surprisingly, the exchange of acetoxy radical by polyetheroxy radical in siloxanes may be performed successfully and quantitatively even without the use of an amount of added auxiliary base, for example ammonia, sufficient to neutralize liberated acetic acid (examples 3 and 4).

Also forming part of the subject matter of this invention and a further preferred embodiment thereof is therefore the salt-free replacement of acetoxy groups bonded to branched siloxane scaffolds by polyetheroxy radicals by reacting with stirring the trifluoromethanesulfonic acid-treated acetoxy-bearing branched siloxane optionally in the presence of bases in a solvent together with the polyetherol and then in the context of a distillation removing the acetic acid formed and possibly already present in the system and residual acetic anhydride employed optionally together with fractions of the solvent employed. This corresponds to a preferred embodiment of the invention for replacement of the siloxane-bonded acetoxy groups via the reaction with polyetherols.

Preferred here are solvents which are inert in the context of the target substitution reaction (replacement of acetoxy radical by polyetheroxy radical) and which in preferred fashion form a thermally separable azeotrope with the acetic acid formed and possibly already present in the system. This corresponds to a further preferred embodiment of the invention, wherein the use of an aromatic, preferably alkylaromatic, solvent is preferred.

Very particularly preferred among the solvents forming binary azeotropes with acetic acid is toluene. The use of toluene thus corresponds to a preferred embodiment of the invention. The boiling points of toluene and acetic acid are 110.6° C. and 118.5° C. respectively and the boiling point of the binary azeotrope is 105.4° C. The azeotrope has a composition of 72% by weight of toluene and 28% by weight of acetic acid (source: Handbook of Chemistry and Physics, 58th Edition, page D2, CRC-Press (1977-1978), West Palm Beach).

The thermal removal of the acidic acid accompanying azeotrope formation ensures complete replacement of the acetoxy functions bonded to the siloxane scaffold by polyetheroxy radicals and thus corresponds to a particularly preferred embodiment of the invention.

Also very particularly preferred here is the application of an auxiliary vacuum since this minimizes the thermal stress on the SiOC-bonded branched polyether siloxane formed (examples 3 and 5).

If the mixture obtained after the second step according to the invention containing an acetoxy-bearing equilibrated siloxane branched in the siloxane portion in addition to any unconverted acetic anhydride and the catalyst acid present therein is in the third step reacted at elevated temperature with a polyetherol without addition of a base, varying proportions of an acetyl-endcapped polyether are also formed in addition to the SiOC-bonded branched silicone polyether according to the chosen stoichiometry of the reactants, the temperature and the reaction time. This corresponds to a preferred embodiment of the invention.

If by contrast an auxiliary base such as for example sodium hydrogencarbonate is initially charged in the polyetherol and this is then admixed with the mixture originating from the second step containing an acetoxy-bearing equilibrated siloxane branched in the siloxane portion in addition to unconverted acetic anhydride and the catalyst acid present therein, the early neutralization of the acid has the result that no esterification of the hydroxy-functional polyether is observed (example 4). This corresponds to a preferred embodiment of the invention.

It is particularly preferable according to the invention when the replacement of the siloxane-bonded acetoxy groups is effected in the presence of a base, in particular in the presence of sodium hydrogencarbonate, ammonia or an organic amine.

However, if the neutralization of the acid present in the reaction system is undertaken at a later juncture, in particular after the thermal removal of acetic acid formed, residual acetic anhydride and any solvent employed, small proportions of the polyetherol present in the system are endcapped with acetyl end groups. Experience has shown that the longer duration of action of the acid present in the system also often results in slightly more strongly colored products (example 3).

In this case after distillative removal of the acetic acid the preparation obtained according to the invention consists of an SiOC-bonded branched silicone polyether together with a polyetherol and an acetyl-endcapped polyetherol. Such preparations having reduced hydroxyl functionality can be of interest in specific applications and likewise form part of the subject matter of the present invention.

This byproduct typical of the invention may be detected by accompanying $^{13}$C-NMR and $^{1}$H-NMR spectroscopy since in particular the shift of the polyether-esterified carboxylate carbon having a δ of about 171.5 ppm is characteristic.

However, it has also been found that, surprisingly, the solventless transformation of trifluoromethanesulfonic acid-treated branched acetoxy-comprising siloxanes into SiOC-bonded polyether siloxanes branched in the siloxane portion is achieved quantitatively very rapidly (within 1 hour) and moreover at very moderate temperatures (T=50° C.) (example 4).

When the replacement of the siloxane-bonded acetoxy groups is effected solventlessly via the reaction with polyetherols this therefore represents a further preferred embodiment of the invention.

Thus also forming part of the subject matter of this invention and a further preferred embodiment thereof is the salt-free replacement of acetoxy functions bonded to branched siloxane scaffolds by polyetheroxy radicals by reacting the trifluoromethanesulfonic acid-treated acetoxy-bearing branched siloxane together with the polyetherol to liberate acetic acid.

The advantages of this inventive salt-free process step are evident to those skilled in the art since filtration steps in production processes are always time intensive, lossy and also associated with disposal issues.

In the context of the present invention it was determined that the acetoxy-functionalization of the DT cycles may in principle be catalysed both through the use of homogeneous acids and heterogeneous acids. It was likewise found that both certain Lewis acids and Brønsted acids are suitable for this purpose. In particular, anhydrous iron(III) chloride, Filtrol® (strongly acidic fuller's earth/acid-treated fuller's earths), concentrated sulfuric acid and particularly preferably trifluoromethanesulfonic acid may be used for catalysing the acetylation step. This corresponds to a preferred embodiment of the invention.

However, the acid catalysts differ greatly in terms of their effectiveness.

It was found that trifluoromethanesulfonic acid not only facilitates incorporation of acetoxy functions into the branched siloxane but also ensures complete equilibration of the thus obtained acetoxy-bearing branched siloxane. In addition to other analytical processes such as gel permeation chromatography (GPC), even a simple hand test where a volume of 0.2 to 0.4 ml of the branched, trifluoromethanesulfonic acid-treated acetoxysiloxane to be tested is applied to a black Bakelite lid and allowed to cure in air is suitable for practical evaluation of the achieved equilibration quality.

Completely equilibrated branched acetoxysiloxanes then form in the course of less than 1 minute a solid white gel whose presence readily contrasts with the background of the black Bakelite lid (example 2 and example 7). By contrast, incompletely equilibrated branched acetoxysiloxanes always afford only samples with a partial gel content and residual liquid.

If the branched acetoxysiloxanes obtained from the acetoxy-functionalization of the DT cycles are subjected to this sensitive test it becomes apparent that while anhydrous iron(III) chloride, Filtrol® (strongly acidic fuller's earth/acid-treated fuller's earths) and concentrated sulfuric acid do catalyse the acetoxy-functionalization they do not lead to fully equilibrated branched acetoxysiloxanes.

The incompletely equilibrated acetoxysiloxanes may then be subjected to an equilibration with trifluoromethanesulfonic acid if desired.

Trifluoromethanesulfonic acid is furthermore particularly preferred for the fact that it does not have a propensity for product discoloration like iron(III) chloride and need not necessarily be separated from the intermediate by filtration like the acidic solid Filtrol®.

On the contrary, trifluoromethanesulfonic acid is to remain in the acetoxy-bearing branched siloxane intermediate (see inventive example 1 and inventive example 2).

For introduction of the acetoxy groups trifluoromethanesulfonic acid is preferably employed in concentrations of 0.05 to 0.2 percent by weight (% by weight), particularly preferably in concentrations of 0.07 to 0.15 percent by weight (% by weight), based on the total mass of the reaction batch. This corresponds to a preferred embodiment of the invention.

The inventors have further found that completely equilibrated branched acetoxysiloxanes can be produced very rapidly and advantageously by reacting the cyclic branched siloxanes of the D/T type under trifluoromethanesulfonic acid catalysis with acetic anhydride optionally in admixture with simple siloxane cycles with addition of acetic acids to afford acetoxy-bearing, branched siloxanes and this corresponds to a very particularly preferred embodiment of the invention.

It is preferable when acetic acid is added in amounts of 0.4 to 3.5 percent by weight, by preference 0.5 to 3 percent by weight, preferably 0.8 to 1.8 percent by weight, particularly preferably in amounts of 1.0 to 1.5 percent by weight, based on the reaction matrix consisting of acetic anhydride, cyclic branched siloxanes of the D/T type and optionally simple siloxane cycles and this corresponds to a very particularly preferred embodiment of the invention.

In the context of a wide-ranging investigation the inventors have found that the acetic acid addition serves not only to achieve the acetoxy functionalization but also to ensure a perfect equilibration result even after a very short reaction time (see example 9). In addition to the above described Bakelite lid test (hand test) an employed indicator for achievement of this equilibrium is the total cycles content determined by gas chromatography and defined as the sum of the $D_4$, $D_5$, $D_6$ contents based on the siloxane matrix and determined after derivatization of the branched acetoxysiloxanes into the corresponding branched isopropoxysiloxanes. Derivatization into the branched isopropoxysiloxanes is intentionally chosen in order to prevent a thermally induced retrocleavage of the branched acetoxysiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4$^{th}$ Edition, O-Metal Derivates of Organic Hydroxy Compounds p. 162 ff)). According to the invention this total cycles content shall preferably be less than 8 percent by weight, preferably less than 7 percent by weight, based on the siloxane matrix composed of branched isopropoxysiloxanes.

Thus anhydrous iron(III) chloride, Filtrol® (strongly acidic fuller's earth) and concentrated sulfuric acid as catalysts only address the first step of the process according to the invention while trifluoromethanesulfonic acid as catalyst advantageously condenses the first and second step into one process step, i.e. catalyses both the acetylation of the cyclic branched siloxanes of the D/T type and the equilibration of the acetoxysiloxane. Moreover, trifluoromethanesulfonic acid may, as elucidated, be used for post-treatment of incompletely equilibrated acetoxysiloxanes.

It therefore corresponds to a preferred embodiment of the invention when upon use of trifluoromethanesulfonic acid as catalyst the first step of the process according to the invention, i.e. the acid-catalysed reaction of mixtures of cyclic branched siloxanes of the D/T type optionally in admixture with simple siloxane cycles with acetic anhydride and preferably with addition of acetic acid to afford acetoxy-bearing branched siloxanes, and the second step, i.e. the equilibration of the acetoxy-modified branched siloxanes, are condensed into one process step.

In the final (i.e. third) step of the process according to the invention the replacement of the acetoxy groups is undertaken by reaction of the trifluoromethanesulfonic acid-treated acetoxysiloxane with polyetherols.

The polyetherols here employable according to the invention are preferably those of formula (I)

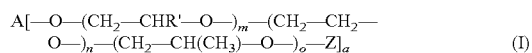   (I)

where

A is either hydrogen or an at least one carbon atom-comprising saturated or unsaturated organic radical, preferably an at least one carbon atom-comprising organic radical of an organic starter compound for preparing the compound, more preferably a methyl, ethyl, propyl, butyl, vinyl or allyl group, R' is independently at each occurrence a saturated alkyl group comprising 2-18 carbon atoms or an aromatic radical, preferably an ethyl group or a phenyl radical respectively, Z is either hydrogen, a linear or branched, saturated or unsaturated hydrocarbon radical comprising 1-18 carbon atoms, preferably a methyl, ethyl, propyl, butyl, vinyl or allyl group, or the radical of an organic acid of formula —C(=O)—ZC, wherein ZC is an organic radical, preferably a linear or branched, saturated or olefinically unsaturated hydrocarbon radical comprising 1 to 17 carbon atoms, preferably a methyl group, or an aromatic hydrocarbon radical comprising 6 to 20 carbon atoms, preferably a phenyl radical, or the radical of formula —C(=O)—O—ZC, wherein ZC is an organic radical, preferably a linear or branched, saturated or olefinically unsaturated hydrocarbon radical comprising 1 to 18 carbon atoms, preferably a methyl group, ethyl group, or an aromatic hydrocarbon radical comprising 6 to 20 carbon atoms, preferably a phenyl radical, m equals from 0 to 50, preferably from 0 to 30, particularly preferably from 0 to 20, n equals from 0 to 250, preferably from 3 to 220, particularly preferably from 5 to 200, o equals from 0 to 250, preferably from 3 to 220, particularly preferably from 5 to 200, a equals from 1 to 8, preferably from greater than 1 to 6, particularly preferably 1, 2, 3 or 4, with the proviso that the sum of m, n and o is equal to or greater than 1 and with the proviso that at least A or Z represent hydrogen.

It is preferable to employ compounds of formula (I) comprising exclusively hydrogen atoms, oxygen atoms and carbon atoms.

The index values recited here and the value ranges of the indices specified may be understood to mean averages (weight averages) of the possible statistical distribution of the actual structures present and/or the mixtures thereof. This also applies to structural formulae reproduced per se exactly as such, for example formula (I).

The units labelled m, n, and o may either be statistically mixed or else may form a blockwise arrangement in the chain. Statistical distributions may have a blockwise structure with any number of blocks and any sequence or be subject to a randomized distribution; they may also have an alternating structure or else form a gradient along the chain; in particular, they can also form any mixed forms thereof in which groups of different distributions may optionally follow one another. Specific embodiments may lead to restrictions to the statistical distributions as a result of the embodiment. There is no change in the statistical distribution for all regions unaffected by the restriction.

In the context of the present invention, radical A is preferably to be understood as meaning radicals of substances forming the start of the to-be-produced compound of formulae (I) which is obtained by addition of alkylene oxides. The starter compound is preferably selected from the group of alcohols, polyetherols and phenols. It is preferable to use as the starter compound containing the group A a mono- or polyfunctional polyether alcohol and/or a mono- or polyfunctional alcohol or any desired mixtures thereof. If a plurality of starter compounds A have been used as a mixture, the index a may also be subject to a statistical distribution. Z may in addition also be the radical of a starter compound Z—OH.

Monomers used with preference in the alkoxylation reaction are ethylene oxide, propylene oxide, butylene oxide and/or styrene oxide and also any desired mixtures of these epoxides. The different monomers may be used in pure form or as a mixture. A further epoxide can also be metered continuously over time into an epoxide already present in the reaction mixture, so as to give rise to an increasing concentration gradient of the epoxide added continuously. The polyoxyalkylenes formed are thus subject to a statistical distribution in the end product, restrictions being determinable via the metered addition. In this case of the continuous addition of a further epoxide to an epoxide already present in the reaction mixture, a structure gradient along the length of the chain is then to be expected. The correlations between metered addition and product structure are known to those skilled in the art.

It is preferable to employ in the process according to the invention compounds of formula (I) having a weight-average molar mass of 76 to 10 000 g/mol, preferably of 100 to 8000 g/mol and particularly preferably of 200 to 6000 g/mol.

Compounds of formula (I) that may be employed are preferably compounds derived from a compound of formula (II)

$$A[\text{—OH}]_a \qquad (II)$$

wherein the radical A derives from compounds selected from the group consisting of mono- and polyfunctional monomeric, oligomeric and polymeric alcohols, phenols, carbohydrates and carbohydrate derivatives, wherein particular preference is given to using compounds where the radical A derives from one or more alcohols from the group of butanol, 1-hexenol, octanol, dodecanol, stearyl alcohol, vinyloxybutanol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, allyl alcohol, vinyl alcohol or from hydroxyl group-bearing compounds based on natural products.

Particular preference is given to using compounds that are liquid at a pressure of 101 325 Pa and a temperature of 23° C. Among these, very particular preference is given to butyl diglycol, dipropylene glycol and propylene glycol.

Compounds of formula (I) employable in accordance with the invention as polyetherols and processes for the production thereof are described for example in EP 0075703, U.S. Pat. No. 3,775,452 and EP 1031603. Suitable processes utilize, for example, basic catalysts, for example alkali metal hydroxides and alkali metal methoxides. The use of KOH is particularly widespread and has been known for many years. Such processes typically comprise reacting a hydroxy-functional starter, generally of low molecular weight, i.e. having a molecular weight below 200 g/mol, such as butanol, allyl alcohol, propylene glycol or glycerol, with an alkylene oxide such as ethylene oxide, propylene oxide, butylene oxide or a mixture of different alkylene oxides in the presence of the alkaline catalyst to afford a polyoxyalkylene polyether. The strongly alkaline reaction conditions in this so-called living polymerization promote various side reactions. The compounds of formulae (II) may also be produced by double metal cyanide catalysis. Polyethers produced by double metal cyanide catalysis generally have a particularly low content of unsaturated end groups of less than or equal to 0.02 milliequivalents per gram of polyether compound (meq/g), preferably less than or equal to 0.015 meq/g, particularly preferably less than or equal to 0.01 meq/g (test method ASTM D2849-69), contain distinctly fewer monools and generally have a low polydispersity of less than 1.5. The polydispersity (PD) may be determined by a method known per se to those skilled in the art by determining by gel permeation chromatography (GPC) both the number-average molecular weight (Mn) and the weight-average molecular weight (Mw). The polydispersity is defined by PD=Mw/Mn. The production of such polyethers is described in U.S. Pat. No. 5,158,922 and EP-A 0654302 for example.

Irrespective of the production route, compounds of formula (I) preferably having a polydispersity Mw/Mn of 1.0 to 1.5, by preference having a polydispersity of 1.0 to 1.3, are preferentially suitable.

Depending on the alkylene oxide terminus, the polyetherols for use according to the invention may have a primary or secondary OH function. In terms of the aspect of the hydrolytic resistance of the obtained SiOC-bonded polyether siloxanes achieved later, the use of polyetherols comprising a secondary alcohol function is preferred in the context of the inventive teaching.

The inventive replacement of the acetoxy groups by reaction with polyetherols to afford SiOC-bonded polyether siloxanes may be effected in the presence of solvents or may preferably be effected without solvent by intimate mixing of the reactants with stirring at reaction temperatures of preferably 20° C. to 60° C.

The molar ratio of the reactants is in particular measured such that at least 1 mol of polyether-bonded OH functionality is employed per mole of acetoxy group of the branched siloxane. It is preferable to employ 1 to 2 mol of polyether-bonded OH functionality, preferably 1.1 to 1.6 mol of polyether-bonded OH functionality, particularly preferably 1.2 to 1.4 mol of polyether-bonded OH functionality, per mole of acetoxy group of the branched siloxane.

The SiOC-bonded branched polyether siloxanes employed in a multiplicity of surface-active applications often have the feature that they contain polyether radicals of differing composition and/or molecular weight. Accordingly, one possible configuration of the process according to the invention comprises reacting the acetoxy-containing equilibrated branched siloxane with a mixture of different polyetherols in the 3rd step. Those skilled in the art are familiar with the sometimes different reaction characteristics of the employed polyetherols so that with the objective in mind to attain a particular surface activity a number of guiding manual tests with polyetherol mixtures are made and these thus obtained products are then each performance-evaluated to achieve an optimal result.

According to the invention the replacement of the acetoxy groups by reaction with polyetherols is preferably effected over the course of 30 minutes to 3 hours.

Also forming part of the subject matter of the invention is a preparation produced by the process according to the invention as described above containing at least one SiOC-bonded branched silicone polyether, a polyetherol and an acetyl-endcapped polyether with the proviso that the polyether radical present in the silicone polyether is chemically identical to the polyether radical of the polyetherol and to the polyether radical of the acetyl-endcapped polyetherol and that the proportion of the SiOC-bonded branched silicone polyether is at least 50 mass percent based on the overall preparation.

Also forming part of the subject matter of the invention is the use of this preparation produced by the process according to the invention as described above as defoamers, as foam stabilizers, wetting agent, paint and flow additives and as demulsifiers.

EXAMPLES

The examples which follow are provided merely to elucidate this invention to those skilled in the art and do not constitute any limitation of the claimed process whatsoever. The inventive determination of the water contents is in principle performed by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si NMR samples are analysed at a measurement frequency of 79.49 MHz in a Bruker Avance III spectrometer equipped with a 287430 sample head with gap width of 10 mm, dissolved at 22° C. in CDCl$_3$ and against a tetramethylsilane (TMS) external standard [δ($^{29}$Si)=0.0 ppm].

The DT cycles employed in the examples are produced according to the processes of the as yet unpublished European patent application EP 17195510.7, EP 17169876.4 or European patent application EP 3 321 304 A1.

The gas chromatograms are captured using an Agilent Technologies GC 7890B instrument fitted with a 30 m×0.32 mm ID×0.25 μm dF HP-1 column (Agilent Technologies no. 19091Z-413E) using hydrogen as a carrier gas and using the following parameters:

Detector: FID; 310° C.
Injector: split; 290° C.
Mode: constant flow 2 mL/min
Temperature program: 60° C. at 8° C./min –150° C. at 40° C./min –300° C. 10 min.

Employed as an indicator for achievement of the equilibrium weight is the total cycles content determined by gas chromatography and defined as the sum of the D$_4$, D$_5$, D$_6$ contents based on the siloxane matrix and determined after derivatization of the α,ω-diacetoxypolydimethylsiloxanes into the corresponding α,ω-diisopropoxypolydimethylsiloxanes. The derivatization into the α,ω-diisopropoxypolydimethylsiloxanes is intentionally chosen in order to prevent a thermally induced retrocleavage of the α,ω-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4$^{th}$ Edition, O-Metal Derivates of Organic Hydroxy Compounds p. 162 ff)).

The employed polyetherols have water contents of about 0.2 mass % and are used without further pre-drying. Employed toluene has a water content of 0.03 mass % and is likewise used without pre-drying.

To ensure the storage stability, which is important in particular with regard to production logistics, the branched acetoxysiloxanes produced according to the invention are, unless explicitly stated otherwise in the respective synthesis examples, initially stored in glass bottles at a storage temperature of 23° C. over a period of 3 weeks before they are reacted with the polyetherols to afford the corresponding SiOC-bonded, branched siloxane-polyoxyalkylene block copolymers and/or the corresponding branched isopropoxysiloxanes.

Example 1

Production of a cyclic branched siloxane having a target D/T ratio of 6:1

In a 10 l four-neck round-bottom flask with a KPG stirrer and fitted with a reflux condenser 783 g (4.39 mol) of methyltriethoxysilane together with 978.7 g (2.64 mol) of decamethylcyclopentasiloxane are heated to 60° C. with stirring, admixed with 2.98 g of trifluoromethanesulfonic acid and the mixture is equilibrated for 4 hours. 237 g of water and 59.3 g of ethanol are then added and the batch is heated to reflux temperature for a further 2 hours. 159.0 g of water and 978.8 g (2.64 mol) of decamethylcyclopentasiloxane ($D_5$) are added and the reflux condenser is exchanged for a distillation bridge and the constituents that are volatile up to 90° C. are distilled off over the next hour. 3000 ml of toluene are then added to the reaction batch and the water still present in the system is removed by distillation up to a bottoms temperature of 100° C. at the water separator. The reaction mixture is allowed to cool to about 60° C., the acid is neutralized by addition of 60.0 g of solid sodium hydrogencarbonate, and the mixture is then stirred for a further 30 minutes to achieve complete neutralization. After cooling to 25° C. the salts are removed with the aid of a fluted filter.

At 70° C. and with an auxiliary vacuum of <1 mbar applied, the toluene used as solvent is distilled off. The distillation bottoms are a colorless mobile liquid, whose $^{29}$Si NMR spectrum shows a D/T ratio of 5.2:1 (target 6.0:1). Based on the sum of the Si units detected by spectroscopy, the D and T units bearing Si-alkoxy and SiOH groups respectively have a proportion of 0.43 mole percent. The gas chromatography analysis of the liquid also shows a proportion of about 15 percent by weight of simple siloxane cycles in the form of $D_4$, $D_5$ and $D_6$. The GPC has a broad molar mass distribution, characterized by Mw=55258 g/mol; Mn: 1693 g/mol and Mw/Mn=32.63.

Example 2

Inventive Steps 1 and 2

Production of an Acetoxy-Terminated Branched Siloxane

In a 500 ml four neck flask with a KPG stirrer, internal thermometer and fitted with a reflux cooler 22.8 g (0.223 mol) of acetic anhydride together with 101.2 g of the DT cycles produced in example 1 (D/T ratio according to $^{29}$Si-NMR spektrum=5.2:1, M=452.8 g/mol and a proportion of SiOH/SiOEt moieties of 0.43 mol %) and 125.9 g of decamethylcyclopentasiloxane ($D_5$) are initially charged with stirring and admixed with 0.25 g (0.15 ml) of trifluoromethanesulfonic acid (0.1 mass % based on the total batch) and rapidly heated to 150° C. The initially slightly cloudy reaction mixture is held at this temperature for 6 hours with continued stirring.

After cooling of the batch a colorless clear mobile liquid whose $^{29}$Si-NMR spectrum demonstrates the presence of Si-acetoxy groups in a yield of about 80% based on the employed acetic anhydride and the complete disappearance of spectroscopically detectable proportions of Si-alkoxy and SiOH groups is isolated. About 0.7 ml of the liquid are applied atop a black Bakelite lid using a pipette. In less than 1 minute a solid white gel without any liquid proportions, whose presence readily contrasts with the background of the black Bakelite lid and demonstrates complete equilibration of the acetoxysiloxane, is formed.

Example 3

Inventive Step 3

Production of a Branched SiOC-Bonded Polyether Siloxane in Toluene With Late Neutralization In a 500 ml four-neck flask with a KPG stirrer, internal thermometer and fitted with a reflux cooler 76.1 g of a butanol-started polyetherol (propylene oxide proportion 100%) having a molar mass of 1935 g/mol (molar mass determined by OH number) in 200 ml of toluene are initially charged with stirring and admixed with 20 g of the branched trifluoromethanesulfonic acid-treated acetoxysiloxane produced in example 2. The reaction mixture is then heated to 40° C. with continued stirring for 1 hour. The reflux cooler is then replaced by a distillation bridge having a distillate receiver and with application of an auxiliary vacuum the batch is freed from toluene and acetic acid by distillation at 70° C.

After cooling the distillation bottoms are admixed with 1.9 g of sodium hydrogencarbonate and the salt is allowed to stir in for about 30 minutes. The salts are then removed using a filter press over a Seitz K 300 filter disc.

This affords a dark-yellowish SiOC-bonded branched polyether siloxane whose $^{29}$Si-NMR spectrum confirms the target structure. A supplementing $^{13}$C-NMR spectrum shows that about 8 mol % of the polyetherol employed in excess are present in acetylated form.

Example 4

Inventive Step 3

Solventless Production of a Branched SiOC-Bonded Polyether Siloxane With Early Neutralization In a 500 ml four-neck flask with a KPG stirrer, internal thermometer and fitted with a reflux cooler 76.1 g of a butanol-started polyetherol (propylene oxide proportion 100%) having a molar mass of 1935 g/mol (molar mass determined by OH number) are initially charged with stirring, admixed with 0.4 g of sodium hydrogencarbonate and the salt is then left to stir in for about 30 minutes. 20 g of the branched trifluoromethanesulfonic acid-treated acetoxysiloxane produced in example 2 are added and the batch is heated to 50° C. with stirring for 1 hour.

The reflux cooler is then replaced by a distillation bridge having a receiver and with application of an auxiliary vacuum of ≥1 mbar (oil pump) acetic acid is distilled off over the course of 3 hours at a bottoms temperature of 100° C. After cooling to 25° C. the distillation bottoms are admixed with 1.9 g of $NaHCO_3$. The hydrogencarbonate is allowed to stir in for 30 minutes and the salts are then removed using a filter press over a Seitz K 300 filter disc.

This affords a light-yellowish clear mobile liquid whose accompanying $^{29}$Si-NMR spectrum demonstrates the structure of the target branched SiOC-bonded polyether siloxane. A supplementing $^{13}$C-NMR spectrum shows that no proportion whatsoever of the polyetherol is present in acetylated form.

Example 5

Inventive Step 3

Production of a Branched SiOC-Bonded Polyether Siloxane in Toluene With Early Neutralization In a 500 ml four-neck flask with a KPG stirrer, internal thermometer and fitted with a reflux cooler 76.1 g of a butanol-started polyetherol (propylene oxide proportion 100%) having a molar mass of 1935 g/mol (molar mass determined by OH number) in 200 ml of toluene are initially charged with stirring and admixed with 20 g of the branched trifluoromethanesulfonic acid-treated acetoxysiloxane produced in example 2.

The reaction mixture is heated to 50° C. with continued stirring for 30 minutes. Then over the course of a further 30 minutes initially the amount of gaseous ammonia required for neutralization is introduced into the reaction matrix. Over the course of a further 45 minutes an additional slight ammonia stream is introduced so that the reaction mixture clearly shows alkaline reaction (moist indicator paper).

The precipitated salts are removed from the toluenic phase via a double-fluted filter.

The crude product is freed of toluene by distillation on a rotary evaporator at a bottoms temperature of 70° C. and an applied auxiliary vacuum of 1 mbar.

The virtually colorless preparation of an SiOC-bonded branched polyether siloxane whose target structure is confirmed by a $^{29}$Si-NMR spectrum is isolated. Accompanying $^{13}$C-NMR and $^1$H-NMR spectroscopy further demonstrate that no proportion whatsoever of acetyl-endcapped polyetherol is present.

Example 6

Production of a Cyclic Branched Siloxane Having a Target D/T Ratio of 6:1

In a 500 ml four-neck round-bottom flask with a KPG stirrer and fitted with a reflux cooler, 52.2 g (0.293 mol) of methyltriethoxysilane are heated to 60° C. together with 130.3 g (0.351 mol) of decamethylcyclopentasiloxane while stirring, 0.400 g of trifluoromethanesulfonic acid is added and the mixture is equilibrated for 4 hours. Then 15.8 g of water and 4.0 g of ethanol are added and the mixture is heated to reflux temperature (about 80° C.) for a further 4 hours. 10.6 g of water and 200 ml of decamethylcyclopentasiloxane ($D_5$) are added and the reflux cooler is exchanged for a distillation bridge, and the constituents that are volatile up to 90° C. are distilled off within the next hour. The reaction mixture is left at 90° C. for a further 2 hours, then allowed to cool down to 50° C., and 5 ml of a 25% aqueous ammonia solution are added and the mixture is stirred for a further hour to complete the neutralization.

At 100° C. and with an auxiliary vacuum of <1 mbar applied, water and the decamethylcyclopentasiloxane ($D_5$) used as solvent are distilled off. After cooling the distillation bottoms, with the aid of a fluted filter, the precipitated ammonium triflate is removed. The filtrate is a colorless mobile liquid, whose $^{29}$Si NMR spectrum shows a D/T ratio of 6.44:1 (target 6.0:1). Based on the sum of the Si units detected by spectroscopy, the D and T units bearing Si-alkoxy and SiOH groups respectively, have a proportion of 4.0 mole percent.

Example 7

Inventive Steps 1 and 2

Production of an Acetoxy-Terminated Branched Siloxane

In a 500 ml four neck flask with a KPG stirrer, internal thermometer and fitted with a reflux cooler 22.8 g (0.223 mol) of acetic anhydride together with 121.8 g of the DT cycles produced in example 5 (D/T ratio according to $^{29}$Si-NMR spectrum=6.44:1, M=544.71 g/mol and a proportion of SiOH/SiOEt moieties of 4.0 mol %) and 106.5 g of decamethylcyclopentasiloxane ($D_5$) are initially charged with stirring and admixed with 0.25 g (0.15 ml) of trifluoromethanesulfonic acid (0.1 mass % based on the total batch) and rapidly heated to 150° C. The initially slightly cloudy reaction mixture is held at this temperature for 6 hours with continued stirring.

After cooling of the batch a colorless clear mobile liquid whose $^{29}$Si-NMR spectrum demonstrates the presence of Si-acetoxy groups in a yield of about 80% based on the employed acetic anhydride and the complete disappearance of spectroscopically detectable proportions of Si-alkoxy and SiOH groups is isolated. About 0.7 ml of the liquid is applied atop a black Bakelite lid using a pipette. In less than 1 minute a solid white gel without any liquid proportions, which readily contrasts with the background of the lid and demonstrates complete equilibration of the acetoxysiloxane, is formed.

Example 8

Inventive Step 3

Solventless Production of a Branched SiOC-Bonded Polyether Siloxane With Early Neutralization In a 500 ml four-neck flask with a KPG stirrer, internal thermometer and fitted with a reflux cooler 76.1 g of a butanol-started polyetherol (propylene oxide proportion 100%) having a molar mass of 1935 g/mol (molar mass determined by OH number) are initially charged with stirring, admixed with 0.4 g of triisopopanolamine and the amine is then allowed to stir in for about 30 minutes. 20 g of the branched trifluoromethanesulfonic acid-treated acetoxysiloxane produced in example 7 are added and the batch is heated to 50° C. with stirring for 1 hour.

The reflux cooler is then replaced by a distillation bridge having a receiver and with application of an auxiliary vacuum of ≥1 mbar (oil pump) acetic acid is distilled off over the course of 3 hours at a bottoms temperature of 100° C. After cooling to 25° C. the distillation bottoms are admixed with 1.9 g of $NaHCO_3$. The hydrogencarbonate is allowed to stir in for 30 minutes and the salts are then removed using a filter press over a Seitz K 300 filter disc.

This affords a light-yellowish clear mobile liquid whose accompanying $^{29}$Si-NMR spectrum demonstrates the structure of the target branched SiOC-bonded polyether siloxane. A supplementing $^{13}$C-NMR spectrum shows that no proportion whatsoever of the polyetherol is present in acetylated form.

Example 9

Preferred Step 2 According to the Invention

Production of an Acetoxy-Terminated, Branched Siloxane

In a 1000 ml four-necked flask with a KPG stirrer, internal thermometer and fitted with a reflux cooler 49.9 g (0.489 mol) of acetic anhydride together with 268.1 g of the DT cycles produced in example 1 (D/T ratio according to $^{29}$Si-NMR spectrum=6.18:1, M=525.42 g/mol and a proportion of SiOH/SiOEt moieties of 0.52 mol %) and 188.5 g of decamethylcyclopentasiloxane ($D_5$) are initially charged with stirring and admixed with 1.03 g (0.5 ml) of trifluoromethanesulfonic acid (0.2 mass % based on the total batch) and 7.6 g of acetic acid (1.5% based on the mass of the reactants) and rapidly heated to 150° C. The initially slightly cloudy reaction mixture is held at this temperature for 6 hours with continued stirring.

After cooling of the batch a colorless clear mobile liquid whose $^{29}$Si-NMR spectrum demonstrates the presence of Si-acetoxy groups in a yield of about 88.2% based on the employed acetic anhydride and the complete disappearance of spectroscopically detectable proportions of Si-alkoxy and SiOH groups is isolated.

Conversion of the Branched Acetoxysiloxane Into the Corresponding Branched Isopropoxysiloxane for Analytical Characterization Immediately after synthesis, in a 250 mL four-necked flask equipped with a KPG stirrer, internal thermometer and fitted with a reflux cooler, 100.0 g of this equilibrated branched acetoxysiloxane acidified with trifluoromethanesulfonic acid is mixed together with 23.2 g of a molecular-sieve-dried isopropanol by stirring at 22° C. Gaseous ammonia ($NH_3$) is introduced to the reaction mixture until alkaline reaction (moist universal indicator paper) and the mixture is then stirred at this temperature for a further 45 minutes. The precipitated salts are separated using a pleated filter.

A colorless clear liquid whose $^{29}$Si-NMR spectrum demonstrates the quantitative conversion of the branched acetoxysiloxane into a branched isopropoxysiloxane is isolated.

An aliquot of this branched isopropoxysiloxane is withdrawn and analyzed by gas chromatography. The gas chromatogram shows the following contents (values in mass percent):

| $D_4$ | $D_5$ | $D_6$ | sum ($D_4 - D_6$) | isopropanol content |
|---|---|---|---|---|
| 2.3% | 1.4% | 0.4% | 4.1% | 7.1% |

Taking account of the isopropanol excess the contents of siloxane cycles ($D_4$, $D_5$ and $D_6$) are calculated here based on the siloxane proportion alone.

The invention claimed is:

1. A process for producing SiOC-bonded polyether siloxanes branched in the siloxane portion from mixtures of cyclic branched siloxanes having only D and T units (D/T type), wherein the process comprises
   in a first step reacting cyclic branched siloxanes of the D/T type with acetic anhydride optionally in admixture with siloxane cycles under acid catalysis to afford acetoxy-bearing branched siloxanes and
   in a second step performing the equilibration of the acetoxy-bearing branched siloxane with trifluoromethanesulfonic acid, with addition of acetic acid to form a trifluoromethanesulfonic acid-treated acetoxysiloxane, and
   in a third step reacting the trifluoromethanesulfonic acid-treated acetoxysiloxane with polyetherols optionally in the presence of bases and optionally in the presence of an inert solvent.

2. The process according to claim 1, wherein the mixtures of cyclic branched siloxanes of the D/T type consist exclusively of siloxanes comprising D and T units with the proviso that the $^{29}$Si NMR spectroscopy-determinable cumulative proportion of D and T units comprising Si-alkoxy and/or Si OH groups present, is less than 2 mole percent, and that they further contain at least 5% by weight of siloxane cycles including octamethylcyclotetrasiloxane ($D_4$), decamethylcyclopentasiloxane ($D_5$) and/or mixtures thereof.

3. The process according to claim 1, wherein the mixtures of cyclic branched siloxanes of the D/T type consist exclusively of siloxanes comprising D and T units with the proviso that the $^{29}$Si NMR spectroscopy-determinable cumulative proportion of D and T units comprising Si-alkoxy and/or Si OH groups is greater than 2 mole percent and less than 10 mole percent.

4. The process according to claim 1, wherein the siloxane cycles optionally also added in the first step comprise octamethylcyclotetrasiloxane, decamethylcyclopentasiloxane, dodecamethylcyclohexasiloxane and/or admixtures thereof.

5. The process according to claim 1, wherein acetic acid is added in amounts of from 0.4 to 3 percent by weight, based on the reaction matrix consisting of acetic anhydride, cyclic branched siloxanes of the D/T type and optionally siloxane cycles.

6. The process according to claim 1, wherein the third step is effected in the presence of sodium hydrogencarbonate, ammonia or an organic amine.

7. The process according to claim 1, wherein the third step is effected via the reaction with polyetherols using an inert solvent.

8. The process according to claim 7, wherein the inert solvent is an aromatic.

9. The process according to claim 1, wherein the third step is effected solventlessly via the reaction with polyetherols.

10. The process according to claim 1, wherein the catalyst in the first step is selected from anhydrous iron(III) chloride, acid treated fuller's earths, concentrated sulfuric acid, trifluoromethanesulfonic acid, and trifluoromethanesulfonic acid in the presence of acetic acid.

11. The process according to claim 1, wherein the polyetherols employed are those of formula (I)

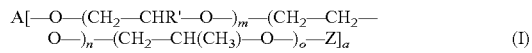

where
A is either hydrogen or an at least one carbon atom-comprising saturated or unsaturated organic radical,
R' is independently at each occurrence a saturated alky 1 group comprising from 2-18 carbon atoms or an aromatic radical,
Z is either hydrogen, a linear or branched, saturated or unsaturated hydrocarbon radical comprising from 1-18 carbon atoms,
the radical of an organic acid of formula —C(═O)—ZE, wherein ZE is an organic radical,
or the radical of formula —C(═O)—O—ZC, wherein ZC is an organic radical,
m equals from 0 to 50,
n equals from 0 to 250,
o equals from 0 to 250,
a equals from 1 to 8,
wherein the sum of m, n and o is equal to or greater than 1 and
wherein at least A or Z represent hydrogen.

12. The process according to claim 1, wherein at least 1 mole of polyether-bonded OH functionality is employed per mole of acetoxy group of the acetoxy bearing branched siloxanes.

13. The preparation produced according to claim 1 containing at least one SiOC-bonded branched silicone polyether, a polyetherol and an acetyl-endcapped polyether wherein the polyether radical present in the silicone polyether is chemically identical to the polyether radical of the polyetherol and to the polyether radical of the acetyl-endcapped polyether and that the proportion of the SiOC-bonded branched silicone polyether is at least 50 mass percent based on the overall preparation.

14. A composition comprising the preparation according to claim 13 wherein the composition may be a defoamer, a foam stabilizer, wetting agent, paint and flow additive or a demulsifier.

15. The process according to claim 1, wherein the mixtures of cyclic branched siloxanes of the D/T type consist exclusively of siloxanes comprising D and T units with the proviso that the $^{29}$Si NMR spectroscopy-determinable cumulative proportion of D and T units comprising Si-alkoxy and/or SiOH groups is less than 1 mole percent and that they further contain at least 5% by weight of siloxane cycles, such as octamethylcyclotetrasiloxane ($D_4$), decamethylcyclopentasiloxane ($D_5$) and/or mixtures thereof.

16. The process according to claim 1, wherein acetic acid is added in amounts of from 0.8 to 1.6 percent by weight based on the reaction matrix consisting of acetic anhydride, cyclic branched siloxanes of the D/T type and optionally siloxane cycles.

17. The process according to claim 7, wherein the inert solvent is an alkylaromatic solvent.

18. The process according to claim 7, wherein the inert solvent is toluene.

19. The process according to claim 1, wherein the polyetherols employed are those of formula (I)

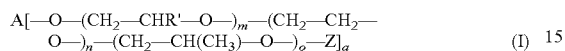

(I)

where

A is a methyl, ethyl, propyl, butyl, vinyl or allyl group,

R' is an ethyl group or a phenyl radical respectively,

Z is a methyl, ethyl, propyl, butyl, vinyl or allyl group, or a phenyl radical, or an aromatic hydrocarbon radical comprising from 6 to 20 carbon atoms, m equals from 0 to 20, n equals from 5 to 200, o equals from 5 to 200, a equals from 1 to 4, wherein the sum of m, n and o is equal to or greater than 1 and wherein at least A or Z represent hydrogen.

20. The process according to claim 1, wherein from 1.2 to 1.4 mole of polyether-bonded OH functionality is employed per mole of acctoxy group of the acetoxy bearing branched siloxanes.

* * * * *